(12) United States Patent
Jung et al.

(10) Patent No.: US 9,834,668 B2
(45) Date of Patent: Dec. 5, 2017

(54) ETHYLENE-ALPHA OLEFIN-DIENE RESIN BLEND COMPOSITION AND METHOD FOR PREPARING THE SAME

(71) Applicants: SK Innovation Co., Ltd., Seoul (KR); SK Global Chemical Co., Ltd., Seoul (KR)

(72) Inventors: Ju-Eun Jung, Daejeon (KR); Sung-Kwan Kim, Daejeon (KR); Yong-Rak Moon, Daejeon (KR); So-Young Park, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 167 days.

(21) Appl. No.: 14/923,939

(22) Filed: Oct. 27, 2015

(65) Prior Publication Data

US 2016/0122520 A1    May 5, 2016

(30) Foreign Application Priority Data

Nov. 3, 2014 (KR) .................. 10-2014-0150858

(51) Int. Cl.
*C08F 210/18* (2006.01)
*C08L 23/16* (2006.01)

(52) U.S. Cl.
CPC ............ *C08L 23/16* (2013.01); *C08F 210/18* (2013.01); *C08F 2420/04* (2013.01); *C08L 2205/025* (2013.01)

(58) Field of Classification Search
CPC .. C08F 210/18; C08F 4/6592; C08F 2420/04; C08L 23/16; C08L 2205/025
See application file for complete search history.

(56) References Cited

U.S. PATENT DOCUMENTS

| | | | |
|---|---|---|---|
| 5,964,969 A * | 10/1999 | Sandstrom et al. | .. B60C 1/0025 152/524 |
| 5,973,017 A | 10/1999 | Okita et al. | |
| 8,353,130 B2 * | 1/2013 | Fukuta et al. ........... | B60J 10/24 49/493.1 |
| 2004/0077793 A1 | 4/2004 | Dees et al. | |
| 2011/0034577 A1 | 2/2011 | Peng et al. | |
| 2012/0116021 A1* | 5/2012 | Liang et al. .......... | C08F 297/06 525/211 |
| 2013/0225834 A1 | 8/2013 | Shin et al. | |
| 2014/0378602 A1* | 12/2014 | Walther et al. ..... | C08L 23/0815 524/526 |

FOREIGN PATENT DOCUMENTS

| | | |
|---|---|---|
| KR | 101248423 B1 | 4/2013 |
| WO | 0246301 A1 | 6/2002 |
| WO | 2009152772 A1 | 12/2009 |
| WO | 2013101933 A1 | 7/2013 |

* cited by examiner

*Primary Examiner* — Nathan M Nutter
(74) *Attorney, Agent, or Firm* — The Webb Law Firm

(57) ABSTRACT

The present invention relates to an EPDM resin blend composition, which includes a first EPDM resin matrix and a second EPDM resin, wherein a ratio ($M_{w1}/M_{w2}$) of a weight average molecular weight of the first EPDM resin matrix to a weight average molecular weight of the second EPDM resin ranges from 0.75 to 1.33, and the second EPDM resin has a narrower molecular weight distribution ($M_w/M_n$) than the first EPDM resin matrix, and to a method for preparing the same.

15 Claims, 3 Drawing Sheets

Fig. 2 (a) Example 1
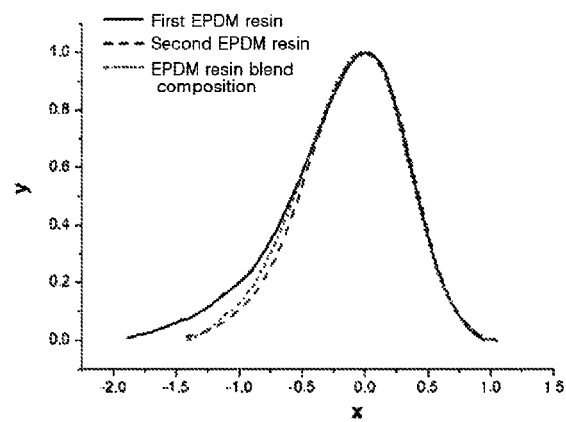
Fig. 2 (b) Comparative Example 1
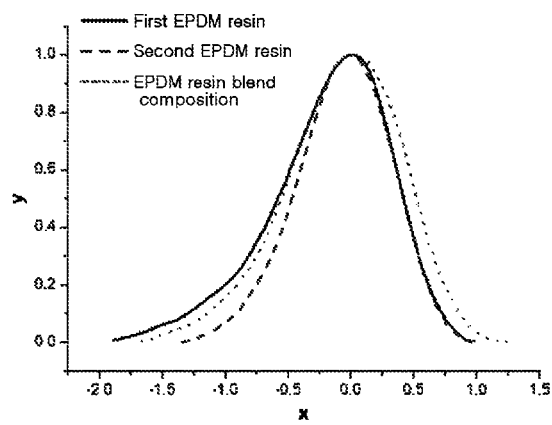

ETHYLENE-ALPHA OLEFIN-DIENE RESIN BLEND COMPOSITION AND METHOD FOR PREPARING THE SAME

CROSS-REFERENCE TO RELATED APPLICATION

This application claims priority to Korean Patent Application No. 10-2014-0150858 filed Nov. 3, 2014, the disclosure of which is hereby incorporated in its entirety by reference.

BACKGROUND

1. Technical Field

The present invention relates to an ethylene-alpha olefin-diene resin blend composition and a method for preparing the same.

2. Description of the Related Art

Since ethylene-alpha olefin-diene (EPDM) resins exhibit outstanding weather resistance, thermal stability and electrical properties as a non-polar rubber material in which a main chain does not include a double bond, the ethylene-alpha olefin-diene (EPDM) resins are variously used in industrial parts including automotive parts. For example, ethylene-alpha olefin-diene (EPDM) resins are a representative rubber material capable of being widely used for purposes of window glass run channels, which are an automotive body sealing part, and weather strips such as front/rear glass molding.

To improve properties of the EPDM resins, although various studies have been conducted to control a structure of a catalyst for preparing the EPDM resins, there has been a great technical difficulty controlling the structure of the catalyst.

In addition, to improve the properties of the EPDM resins, although studies have been conducted to prepare an EPDM resin blend composition by mixing two or more EPDM resins, there has been a limit in improving both properties and processability of the EPDM resin blend composition.

BRIEF SUMMARY

It is an aspect of the present invention to provide an EPDM resin blend composition which exhibits excellent properties and processability and includes a first EPDM resin matrix and a second EPDM resin, wherein a ratio ($M_{w1}/M_{w2}$) of a weight average molecular weight of the first EPDM resin matrix to a weight average molecular weight of the second EPDM resin ranges from 0.75 to 1.33, and the second EPDM resin has a narrower molecular weight distribution than the first EPDM resin matrix.

The present invention is not limited to the above aspect and other aspects of the present invention will be clearly understood by those skilled in the art from the following description.

In accordance with one aspect of the present invention, an EPDM resin blend composition includes a first EPDM resin matrix and a second EPDM resin, wherein a ratio ($M_{w1}/M_{w2}$) of a weight average molecular weight of the first EPDM resin matrix to a weight average molecular weight of the second EPDM resin ranges from 0.75 to 1.33, and the second EPDM resin has a narrower molecular weight distribution ($M_w/M_n$) than the first EPDM resin matrix.

The ratio of the weight average molecular weight of the first EPDM resin matrix to the weight average molecular weight of the second EPDM resin may range from 0.95 to 1.05.

A log value ($\log M_w$) of the weight average molecular weight of the first EPDM resin matrix or the second EPDM resin may range from 5 to 6.

A difference in molecular weight distribution between the first EPDM resin matrix and the second EPDM resin may be 0.7 or more.

The first EPDM resin matrix may include 40% by weight (wt %) to 80 wt % of an ethylene monomer, 20 wt % to 60 wt % of an alpha olefin monomer, and 0.001 wt % to 15 wt % of a diene monomer.

The second EPDM resin may include 40 wt % to 80 wt % of the ethylene monomer, 20 wt % to 60 wt % of the alpha olefin monomer, and 0.001 wt % to 15 wt % of the diene monomer.

The alpha olefin monomer may be a branched alpha olefin monomer selected from the group consisting of 3-methyl-1-butene, 3-methyl-1-pentene, 4-methyl-1-pentene, 3-methyl-1-hexene, 4-methyl-1-hexene, 5-methyl-1-hexene, 3-ethyl-1-pentene, 3-methyl-1-heptene, 4-methyl-1-heptene, 5-methyl-1-heptene, 6-methyl-1-heptene, 3-ethyl-1-hexene, 4-ethyl-1-hexene, and 3-propyl-1-pentene.

The first EPDM resin matrix or the second EPDM resin may be prepared using a Ziegler-Natta catalyst or a metallocene catalyst.

The EPDM resin blend composition may include 51 wt % to 95 wt % of the first EPDM resin matrix as a main component and 49 wt % to 5 wt % of the second EPDM resin as an additional component.

A variation rate of Mooney viscosity (ML (1+4) at 125° C.) of the EPDM resin blend composition with respect to a Mooney viscosity (ML (1+4) at 125° C.) of the first EPDM resin matrix may be ±10% or less.

The EPDM resin blend composition may have a narrower molecular weight distribution than the first EPDM resin matrix.

The EPDM resin blend composition may have a higher uniformity satisfying Equation 1 than the first EPDM resin matrix.

$$\text{Uniformity} = \frac{1}{\sum_{i=o}^{i=0.5}\sqrt{(a-b)_i^4} + \sum_{i=0.5}^{i=1}\sqrt{(a-b)_i^2}} \quad \text{[Equation 1]}$$

wherein, when an X axis (log values of weight average molecular weights) of a GPC curve is transformed into $X-X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis.

The EPDM resin blend composition may have a narrower broadness satisfying Equation 2 than the first EPDM resin matrix.

$$\text{Broadness} = \frac{\sum_{i=0}^{i=1}(a+b)_i}{\sum_i} \quad \text{[Equation 2]}$$

wherein, when an X axis (log values of weight average molecular weights) of a GPC curve is transformed into $X-X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis.

In accordance with another aspect of the present invention, a method for preparing an EPDM resin blend composition includes: (a) preparing a first EPDM resin matrix by polymerizing an ethylene monomer, an alpha olefin monomer and a diene monomer; (b) preparing a second EPDM resin by polymerizing an ethylene monomer, an alpha olefin monomer and a diene monomer; and (c) adding the second EPDM resin to the first EPDM resin matrix and mixing the resin components, wherein a ratio of a weight average molecular weight of the first EPDM resin matrix to a weight average molecular weight of the second EPDM resin ranges from 0.75 to 1.33, and the second EPDM resin has a narrower molecular weight distribution than the first EPDM resin matrix.

Step (a) and step (b) may be sequentially performed in a single reactor, or simultaneously performed in multiple reactors.

Mixing in step (c) may be performed using a batch mixer or a continuous mixer.

According to the present invention, since the EPDM resin blend composition is obtained by adding the second EPDM resin, which has a similar weight average molecular weight to the first EPDM resin matrix and a narrower molecular weight distribution than the first EPDM resin matrix, to the first EPDM resin matrix and mixing the same, the EPDM resin blend composition maintains good processability equivalent to that of the first EPDM resin matrix while exhibiting improved properties as compared with the first EPDM resin matrix.

BRIEF DESCRIPTION OF THE DRAWINGS

FIG. 2($a$) and FIG. 2($b$) show graphs depicting comparisons of uniformity and broadness for molecular weight distribution among first EPDM resin matrices, second EPDM resins and EPDM resin blend compositions according to Example 1 and Comparative Example 1.

DETAILED DESCRIPTION

Figure 1:
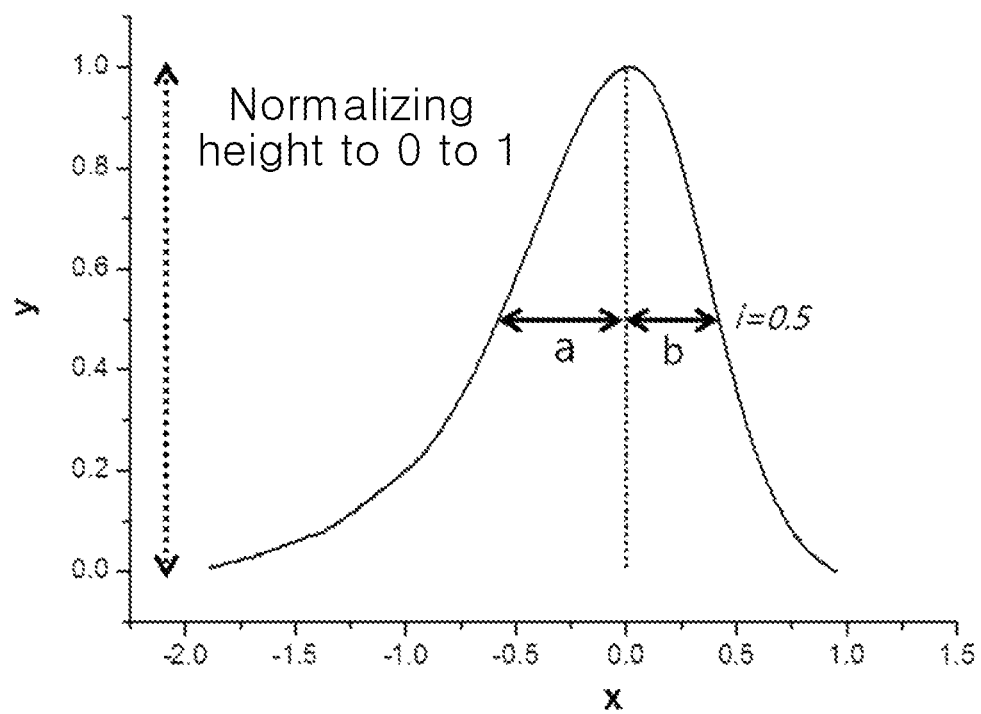
FIG. 1 is a graph obtained by transforming an X axis (log values of weight average molecular weights) of a GPC curve into $X-X_{max}$ and normalizing a Y axis (concentrations) of the GPC curve to 0 to 1.

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof.

EPDM Resin Blend Composition

In accordance with one aspect of the present invention, an EPDM resin blend composition includes a first EPDM resin matrix and a second EPDM resin, wherein a ratio ($M_{w1}/M_{w2}$) of a weight average molecular weight of the first EPDM resin matrix to a weight average molecular weight of the second EPDM resin ranges from 0.75 to 1.33, and the second EPDM resin has a narrower molecular weight distribution ($M_w/M_n$) than the first EPDM resin matrix.

As used herein, the term "EPDM resin" refers to ethylene-alpha olefin-diene resins, and since the ethylene-alpha olefin-diene resins exhibit outstanding weather resistance, ozone resistance, thermal stability and electrical properties as a non-polar rubber material in which a main chain does not include a double bond, the ethylene-alpha olefin-diene resins can be variously used for industrial parts including automotive parts.

The EPDM resin blend composition is an EPDM resin blend composition including the first EPDM resin matrix and the second EPDM resin, wherein the first EPDM resin matrix is present as a main component and the second EPDM resin is present as an additional component.

The first EPDM resin matrix is prepared by polymerizing an ethylene monomer, an alpha olefin monomer and a diene monomer, and may include 40 wt % to 80 wt % of an ethylene monomer, 20 wt % to 60 wt % of the alpha olefin monomer and 0.001 wt % to 15 wt % of the diene monomer.

Specifically, the ethylene monomer serves to impart strength and high filling rate to rubber and may be present in an amount of 40 wt % to 80 wt % in the first EPDM resin matrix.

In addition, the alpha olefin monomer serves to impart elasticity to rubber by reducing crystallinity through disorderly distribution thereof in conjunction with the ethylene monomer, and may be present in an amount of 20 wt % to 60 wt % in the first EPDM resin matrix. Here, the alpha olefin monomer may be a branched, linear or cyclic $C_3$ to $C_{18}$ alpha olefin monomer, and examples of the branched, linear or cyclic $C_3$ to $C_{18}$ alpha olefin monomer may include propylene, 1-butene, 1-pentene, 3-methyl-1-butene, 1-hexene, 3-methyl-1-pentene, 4-methyl-1-pentene, 1-heptene, 3-methyl-1-hexene, 4-methyl-1-hexene, 5-methyl-1-hexene, 3-ethyl-1-pentene, 1-octene, 3-methyl-1-heptene, 4-methyl-1-heptene, 5-methyl-1-heptene, 6-methyl-1-heptene, 3-ethyl-1-hexene, 4-ethyl-1-hexene, 3-propyl-1-pentene, 1-decene, and the like.

Further, the diene monomer is a monomer which is involved in vulcanization and includes a double bond, and may be present in an amount of 0.001 wt % to 15 wt % in the first EPDM resin matrix. Here, the diene monomer may include 2-ethylidene-2-norbornene, 1,4-hexadiene, dicyclopentadiene, and the like.

The second EPDM resin is prepared by polymerizing an ethylene monomer, an alpha olefin monomer and a diene monomer. The amount of the alpha olefin monomer used for polymerization of the first EPDM resin matrix may be lower than the amount of the alpha olefin monomer used for polymerization of the second EPDM resin, without being limited thereto. The second EPDM resin may include 40 wt % to 80 wt % of the ethylene monomer, 20 wt % to 60 wt % of the alpha olefin monomer and 0.001 wt % to 15 wt % of the diene monomer.

Specifically, the ethylene monomer serves to impart strength and high filling rate to rubber and may be present in an amount of 40 wt % to 80 wt % in the second EPDM resin.

In addition, the alpha olefin monomer serves to impart elasticity to rubber by reducing crystallinity through disorderly distribution thereof in conjunction with the ethylene monomer, and may be present in an amount of 20 wt % to 60 wt % in the second EPDM resin. Here, the alpha olefin monomer may be a branched, linear or cyclic $C_3$ to $C_{18}$ alpha olefin monomer similarly to the alpha olefin monomer in the first EPDM resin matrix. Preferably, the alpha olefin monomer is a branched $C_3$ to $C_{18}$ alpha olefin monomer for improvement of processability of the EPDM resin blend composition, more preferably an alpha olefin monomer selected from the group consisting of 3-methyl-1-butene, 3-methyl-1-pentene, 4-methyl-1-pentene, 3-methyl-1-hexene, 4-methyl-1-hexene, 5-methyl-1-hexene, 3-ethyl-1-pentene, 3-methyl-1-heptene, 4-methyl-1-heptene, 5-methyl-1-heptene, 6-methyl-1-heptene, 3-ethyl-1-hexene, 4-ethyl-1-hexene, and 3-propyl-1-pentene, without being limited thereto. When the second EPDM resin includes the branched alpha olefin monomer as described above, there is an advantage in that deterioration in processability of the EPDM resin blend composition can be sufficiently supplemented despite the narrow molecular weight distribution ($M_w/M_n$) of the second EPDM resin.

Further, the diene monomer is a monomer which is involved in vulcanization and includes a double bond, and may be present in an amount of 0.001 wt % to 15 wt % in the second EPDM resin. Here, the diene monomer may include 2-ethylidene-2-norbornene, 1,4-hexadiene, dicyclopentadiene, and the like.

The first EPDM resin matrix or the second EPDM resin may be prepared using a Ziegler-Natta catalyst or a metallocene catalyst.

Typically, an EPDM resin blend composition is prepared by adding an EPDM resin, which has a lower or higher weight average molecular weight than an EPDM resin matrix, to the EPDM resin matrix. Since the EPDM resin blend composition prepared by this method has a wider molecular weight distribution than the EPDM resin matrix, although generally having an advantage in processability, the EPDM resin blend composition has a problem of deterioration in properties such as crosslinking rate, shear resistance, and the like.

Therefore, according to the present invention, to improve properties of the EPDM resin blend composition, the second EPDM resin, which has a similar weight average molecular weight to the first EPDM resin matrix, is added to and mixed with the first EPDM resin matrix.

Specifically, the ratio ($M_{w1}/M_{w2}$) of the weight average molecular weight of the first EPDM resin matrix to the weight average molecular weight of the second EPDM resin ranges from 0.75 to 1.33, preferably from 0.95 to 1.05, without being limited thereto. Here, if the ratio ($M_{w1}/M_{w2}$) of the weight average molecular weight of the first EPDM resin matrix to the weight average molecular weight of the second EPDM resin is out of the range as set forth above, since a variation rate of Mooney viscosity of the EPDM resin blend composition with respect to Mooney viscosity of the first EPDM resin matrix is too high, there is a problem in that the EPDM resin blend composition does not maintain the same specifications and significantly deviates from final target specifications.

A log value (log $M_w$) of the weight average molecular weight of the first EPDM resin matrix or the second EPDM resin may range from 5 to 6, without being limited thereto.

In addition, according to the present invention, the second EPDM resin has a narrower molecular weight distribution ($M_w/M_n$) than the first EPDM resin matrix. For the second EPDM resin to have a narrower molecular weight distribution than the first EPDM resin matrix, the amount of the alpha olefin monomer used for polymerization of the second EPDM resin should be lower than the amount of the alpha olefin monomer used for polymerization of the first EPDM resin matrix, and in some cases, it is necessary to control an amount of hydrogen introduced for control of molecular weight.

As used herein, the term "molecular weight distribution ($M_w/M_n$)" of a polymer refers to a ratio of weight average molecular weight to number average molecular weight of the polymer. Here, the number average molecular weight and the weight average molecular weight are calculated from a molecular weight distribution curve obtained from a system in which a refractive index detector is connected to a gel chromatography apparatus. Generally, if the molecular weight distribution is narrow, the polymer has a problem of relatively deteriorated processability despite exhibiting excellent properties.

Specifically, a difference in molecular weight distribution between the first EPDM resin matrix and the second EPDM resin may be 0.7 or more, without being limited thereto.

The EPDM resin blend composition may include 51 wt % to 95 wt % of the first EPDM resin matrix as a main component and 49 wt % to 5 wt % of the second EPDM resin as an additional component.

Here, if the amount of the first EPDM resin matrix is less than the range as set forth above, the EPDM resin blend composition can exhibit deterioration in processability and does not maintain the same specifications as the first EPDM resin matrix, and if the amount of the first EPDM resin matrix is greater than the range as set forth above, since it is difficult to anticipate efficient reduction of the molecular weight distribution ($M_w/M_n$) due to relative reduction in the amount of the second EPDM resin, it is difficult to improve the properties of the EPDM resin blend composition. In addition, if the amount of the second EPDM resin is less than the range as set forth above, there is a problem of deterioration in the properties of the EPDM resin blend composition, and if the amount of the second EPDM resin is greater than the range as set forth above, there is a problem of deterioration in processability of the EPDM resin blend composition due to relative reduction in the amount of the first EPDM resin matrix.

The variation rate of the Mooney viscosity (ML (1+4) at 125° C.) of the EPDM resin blend composition with respect to the Mooney viscosity (ML (1+4) at 125° C.) of the first EPDM resin matrix may be ±10% or less.

The EPDM resin blend composition may have a narrower molecular weight distribution ($M_w/M_n$) than the first EPDM resin matrix. The EPDM resin blend composition exhibits improved properties due to the narrow molecular weight distribution ($M_w/M_n$) thereof.

In addition, the EPDM resin blend composition may have a higher uniformity satisfying Equation 1 than the first EPDM resin matrix.

$$\text{Uniformity} = \frac{1}{\sum_{i=0}^{i=0.5}\sqrt{(a-b)_i^4} + \sum_{i=0.5}^{i=1}\sqrt{(a-b)_i^2}} \qquad [\text{Equation 1}]$$

wherein, when an X axis (log values of weight average molecular weights) of a GPC curve is transformed into X-$X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis. Here, $X_{max}$ refers to a log value of a weight average molecular weight corresponding to the maximum peak value (see FIG. 1).

To improve properties of an EPDM resin, if the EPDM resin alone is prepared by a method such as controlling a structure of a catalyst, instead of preparing an EPDM resin blend composition by mixing two or more EPDM resins, there is a problem in that, since the EPDM resin has a tail distribution toward a low molecular weight, the EPDM resin exhibits deteriorated uniformity. Therefore, according to the present invention, uniformity of the EPDM resin blend composition is improved by mixing two or more EPDM resins, thereby further improving the properties thereof.

That is, even though the EPDM resin alone and the EPDM resin blend composition according to the present invention have the same molecular weight distribution, while the EPDM resin alone exhibits low uniformity, the EPDM resin blend composition according to the present invention exhibits high uniformity due to uniform mixing.

In addition, the EPDM resin blend composition may have a narrower broadness satisfying Equation 2 than the first EPDM resin matrix.

$$\text{Broadness} = \frac{\sum_{i=0}^{i=1}(a+b)_i}{\sum_i} \quad [\text{Equation 2}]$$

wherein, when an X axis (log values of weight average molecular weights) of a GPC curve is transformed into $X-X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis. Here, $X_{max}$ refers to a log value of a weight average molecular weight corresponding to the maximum peak value (see FIG. 1).

FIG. 2 shows graphs depicting comparisons of uniformity and broadness for molecular weight distribution among first EPDM resin matrices, second EPDM resins and EPDM resin blend compositions according to Example 1 and Comparative Example 1.

As shown in FIG. 2, since the EPDM resin blend composition according to Example 1 exhibits improvement in uniformity and reduction in broadness as compared with the first EPDM resin matrix, the EPDM resin blend composition according to Example 1 maintains the same level of processability as the first EPDM resin matrix while exhibiting improved properties.

Method for Preparing EPDM Resin Blend Composition

In accordance with another aspect of the present invention, a method for preparing an EPDM resin blend composition includes: (a) preparing a first EPDM resin matrix by polymerizing an ethylene monomer, an alpha olefin monomer and a diene monomer; (b) preparing a second EPDM resin by polymerizing an ethylene monomer, an alpha olefin monomer and a diene monomer; and (c) adding the second EPDM resin to the first EPDM resin matrix and mixing the resin components, wherein a ratio of a weight average molecular weight of the first EPDM resin matrix to a weight average molecular weight of the second EPDM resin ranges from 0.75 to 1.33, and the second EPDM resin has a narrower molecular weight distribution than the first EPDM resin matrix.

Step (a) and step (b) may be sequentially performed in a single reactor, or simultaneously performed in multiple reactors. The reactor may be a continuous polymerization apparatus.

Mixing in step (c) may be performed by a batch mixer or a continuous mixer, whereby uniform mixing can be performed.

Specifically, the first EPDM resin matrix and the second EPDM resin are prepared in order in the continuous polymerization apparatus or are simultaneously prepared in the continuous polymerization apparatus, in which reactors are arranged in series or in parallel, followed by adding the second EPDM resin to the first EPDM resin matrix and mixing the resin components using a batch mixer or a continuous mixer, thereby preparing the EPDM resin blend composition. Here, the batch mixer may be a kneader, a Banbury mixer or a roll mill, and the continuous mixer may be a calender.

Details of the first EPDM resin matrix, the second EPDM resin and the EPDM resin blend composition have been described above.

Hereinafter, the present invention will be explained in more detail with reference to some examples. It should be understood that these examples are provided for illustration only and are not to be construed in any way as limiting the present invention.

EXAMPLE

Example 1

5 wt % of an ethylene monomer, 7.5 wt % of an alpha olefin monomer, 1.5 wt % of a diene monomer and 86 wt % of a methylcyclohexane solvent were polymerized at a temperature of 90° C. and a pressure of 40 bar in a first continuous polymerization apparatus using a catalyst disclosed in Korean Patent Registration Publication No. 10-1248423, thereby preparing a first EPDM resin matrix. Next, 5 wt % of ethylene, 6 wt % of an alpha olefin, 1.5 wt % of a diene and 87.5 wt % of a methylcyclohexane solvent were polymerized at a temperature of 99° C. and a pressure of 40 bar in a first continuous polymerization apparatus using the catalyst disclosed in Korean Patent Registration Publication No. 10-1248423, thereby preparing a second EPDM resin. 30 parts by weight of the second EPDM resin was added to 70 parts by weight of the first EPDM resin matrix, followed by mixing the resin components using a Banbury mixer, thereby preparing an EPDM resin blend composition.

Composition of each of the first EPDM resin matrix, the second EPDM resin and the EPDM resin blend composition were measured in accordance with D3900 (ethylene and alpha olefin) and ASTM D6947 (diene) using an FT-IR spectrometer (Nicolet 6700, Thermo Scientific Co., Ltd.). Here, the first EPDM resin matrix included 48.6 wt % of ethylene, 43.4 wt % of the alpha olefin and 8.0 wt % of the diene, the second EPDM resin included 50.6 wt % of ethylene, 41.4 wt % of the alpha olefin and 8.0 wt % of the diene, and the EPDM resin blend composition included 48.1 wt % of ethylene, 44.1 wt % of the alpha olefin and 7.8 wt % of the diene.

In addition, Mooney viscosity of each of the first EPDM resin matrix, the second EPDM resin and the EPDM resin blend composition was measured using a Mooney viscometer (MV2000, Alpha Technologies Co., Ltd.). Using a large rotor, a value was measured at 125° C. after pre-heating for 1 minute and then after 4 minutes elapsed from the time of starting the rotor, and represented as ML 1+4 at 125° C.

Further, a weight average molecular weight ($M_w$) and a molecular weight distribution ($M_w/M_n$) of each of the first EPDM resin matrix, the second EPDM resin and the EPDM resin blend composition were analyzed using a high temperature GPC system (PL-220, Agilent Co., Ltd.). Three pieces of PLgel Olexis (Agilent Co., Ltd.) were mounted as a system column, a refractive index detector having a cell volume of 8 μL and a wavelength of 890 nm was used as a detector, and the solvent was eluted at a rate of 1.0 mL/min. A specimen was dissolved to a concentration of 1 mg/mL (specimen weight/solvent volume) in 1,2,4-trichlorobenzene (TCB) at 135° C. for 2 hours, followed by injecting the solution into the system, thereby obtaining a chromatogram. Next, using a molecular weight calibration curve plotted by an elution time of the specimen and elution times of a polystyrene standard specimen set and polyethylene, the weight average molecular weight and the molecular weight distribution of the specimen were calculated.

Furthermore, uniformity (x10-4) and broadness of each of the first EPDM resin matrix, the second EPDM resin and the EPDM resin blend composition were calculated to satisfy Equation 1 and Equation 2. Results of uniformity (x10-4) and broadness in a GPC curve are shown in Table 1.

$$\text{Uniformity} = \frac{1}{\sum_{i=o}^{i=0.5}\sqrt{(a-b)_i^4} + \sum_{i=0.5}^{i=1}\sqrt{(a-b)_i^2}}, \quad [\text{Equation 1}]$$

$$\text{Broadness} = \frac{\sum_{i=0}^{i=1}(a+b)_i}{\sum_i}, \quad [\text{Equation 2}]$$

wherein, when an X axis (log values of weight average molecular weights) of a GPC curve is transformed into X-X$_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis.

Example 2

4.4 wt % of an ethylene monomer, 7.4 wt % of an alpha olefin monomer, 2.2 wt % of a diene monomer and 86 wt % of a methylcyclohexane solvent were polymerized at a temperature of 88° C. and a pressure of 40 bar in a first continuous polymerization apparatus using a catalyst disclosed in Korean Patent Registration Publication No. 10-1248423, thereby preparing a first EPDM resin matrix. Next, 4.4 wt % of ethylene, 5.9 wt % of an alpha olefin, 2.2 wt % of a diene and 87.5 wt % of a methylcyclohexane solvent were polymerized at a temperature of 97° C. and a pressure of 40 bar in a first continuous polymerization apparatus using the catalyst disclosed in Korean Patent Registration Publication No. 10-1248423, thereby preparing a second EPDM resin. 30 parts by weight of the second EPDM resin was added to 70 parts by weight of the first EPDM resin matrix, followed by mixing the resin components using a Banbury mixer, thereby preparing an EPDM resin blend composition.

The first EPDM resin matrix included 45.3 wt % of ethylene, 40.9 wt % of the alpha olefin and 13.8 wt % of the diene, the second EPDM resin included 46.6 wt % of ethylene, 39.7 wt % of the alpha olefin and 13.7 wt % of the diene, and the EPDM resin blend composition included 45.8 wt % of ethylene, 40.4 wt % of the alpha olefin and 13.8 wt % of the diene.

Comparative Example 1

An EPDM resin blend composition was prepared in the same manner as in Example 1 except that the second EPDM resin was prepared by polymerizing 5 wt % of the ethylene monomer, 4 wt % of the alpha olefin monomer, 1.0 wt % of the diene monomer, 90.0 wt % of the methylcyclohexane solvent and 5 ppm of hydrogen at a temperature of 91° C. and a pressure of 40 bar in a second continuous polymerization apparatus using the catalyst disclosed in Korean Patent Registration Publication No. 10-1248423.

Here, the second EPDM resin included 56.2 wt % of ethylene, 35.9 wt % of the alpha olefin and 7.9 wt % of the diene, and the EPDM resin blend composition included 51.1 wt % of ethylene, 40.8 wt % of the alpha olefin and 8.1 wt % of the diene.

The EPDM resin blend composition included 48.1 wt % of ethylene, 44.1 wt % of the alpha olefin and 7.8 wt % of the diene.

Comparative Example 2

An EPDM resin blend composition was prepared in the same manner as in Example 1 except that the second EPDM resin was prepared by polymerizing 4.5 wt % of the ethylene monomer, 3.9 wt % of the alpha olefin monomer, 1.6 wt % of the diene monomer, 90.0 wt % of the methylcyclohexane solvent and 5 ppm of hydrogen at a temperature of 90° C. and a pressure of 40 bar in a second continuous polymerization apparatus using the catalyst disclosed in Korean Patent Registration Publication No. 10-1248423.

Here, the second EPDM resin included 51.2 wt % of ethylene, 35.2 wt % of the alpha olefin and 13.6 wt % of the diene, and the EPDM resin blend composition included 47.6 wt % of ethylene, 38.7 wt % of the alpha olefin and 13.7 wt % of the diene.

The EPDM resin blend composition included 45.8 wt % of ethylene, 40.4 wt % of the alpha olefin and 13.8 wt % of the diene.

TABLE 1

|  |  | Example 1 | Example 2 | Comparative Example 1 | Comparative Example 2 |
|---|---|---|---|---|---|
| First EPDM resin matrix | ML1 + 4 at 125° C. | 114.4 | 116.0 | 114.4 | 116.0 |
|  | Mw | 260,669 | 261,000 | 260,669 | 261,000 |
|  | Mw/Mn | 3.89 | 3.91 | 3.89 | 3.91 |
|  | Uniformity (x10−4) | 7.50 | 7.52 | 7.50 | 7.52 |
|  | Broadness | 1.10 | 1.12 | 1.10 | 1.12 |
| Second EPDM resin | ML1 + 4 at 125° C. | 101.1 | 102.7 | 32.9 | 34.5 |
|  | Mw | 212,055 | 212,386 | 126,821 | 127,152 |
|  | Mw/Mn | 2.41 | 2.43 | 2.32 | 2.34 |
|  | Uniformity (x10−4) | 10.72 | 10.74 | 11.61 | 11.63 |
|  | Broadness | 1.02 | 1.04 | 0.95 | 0.97 |
| EPDM resin blend | ML1 + 4 at 125° C. | 117.4 | 119.0 | 84.9 | 86.5 |
|  | Mw | 255,805 | 256,136 | 220,920 | 221,251 |

TABLE 1-continued

|  |  | Example 1 | Example 2 | Comparative Example 1 | Comparative Example 2 |
|---|---|---|---|---|---|
| composition | Mw/Mn | 2.77 | 2.79 | 3.82 | 3.84 |
|  | Uniformity (×10−4) | 8.02 | 8.04 | 3.78 | 3.80 |
|  | Broadness | 1.03 | 1.05 | 1.16 | 1.18 |

As shown in Table 1 and FIG. 1, the EPDM resin blend composition according to Example 1 was prepared by adding the second EPDM resin, which had a similar weight average molecular weight to the first EPDM resin matrix and had a narrow molecular weight distribution, to the first EPDM resin matrix and mixing the resin components, and exhibited increase in uniformity and reduction in broadness as compared with the first EPDM resin matrix while exhibiting a narrower molecular weight distribution than the first EPDM resin matrix. In addition, it could be confirmed that, since the variation rate of Mooney viscosity of the EPDM resin blend composition with respect to Mooney viscosity of the first EPDM resin matrix was only about +2.6%, the EPDM resin blend composition maintained the same specifications as the first EPDM resin matrix.

On the other hand, the EPDM resin blend composition according to Comparative Example 1 was prepared using the second EPDM resin having a low weight average molecular weight and exhibited reduction in uniformity and increase in broadness. In addition, it could be confirmed that, since the variation rate of the Mooney viscosity of the EPDM resin blend composition with respect to the Mooney viscosity of the first EPDM resin matrix was about −25.8%, the EPDM resin blend composition according to Comparative Example 1 did not maintain the same specifications as the first EPDM resin matrix and significantly deviated from final target specifications.

And, the EPDM resin blend composition according to Comparative Example 2 was prepared using the second EPDM resin having a low weight average molecular weight and exhibited reduction in uniformity and increase in broadness. In addition, it could be confirmed that, since the variation rate of the Mooney viscosity of the EPDM resin blend composition with respect to the Mooney viscosity of the first EPDM resin matrix was about −25.4%, the EPDM resin blend composition according to Comparative Example 1 did not maintain the same specifications as the first EPDM resin matrix and significantly deviated from final target specifications.

Experimental Example: Evaluation of Properties and Processability 90.0 parts by weight of carbon black (FEF), 40.0 parts by weight of calcium carbonate, 75.0 parts by weight of a processing oil, 4.8 parts by weight of zinc oxide and 2.0 parts by weight of stearic acid were added to 100 parts by weight of each of the (a) first EPDM resin matrix and the (b) EPDM resin blend composition according to Example 1, followed by mixing the resin components using a Banbury mixer. Next, 1.1 parts by weight of sulfur as a vulcanizing agent; 1.0 part by weight of 2-mercaptobenzothiazole (MBT), 0.6 parts by weight of dipentamethylenethiuram tetrasulfide (DPTT), 1.0 part by weight of 2-mercaptoimidazoline (#22), 1.0 part by weight of a zinc salt of di-n-butyldithiocarbamate (ZnBDC) and 1.0 part by weight of 4,4-dithiodimorpholine (Vulnoc-R) as vulcanization accelerators; and 2.0 parts by weight of p,p'-oxybis(benzenesulfonyl hydrazide) (B. A OBSH) and 1.2 parts by weight of azodicarbonamide (AC 330) as foaming agents were added to the mixture, followed by mixing at 50° C. and 20 rpm for 10 minutes using a 8 inch open roll mixer. Next, the resultant was evaluated as to properties and processability.

1. Evaluation of Properties

Properties of each of the (a) first EPDM resin matrix and the (b) EPDM resin blend composition were evaluated in accordance with test methods as listed in Table 2.

TABLE 2

|  |  | Example 1 | | Example 2 | |
|---|---|---|---|---|---|
| Test item | Test method | (a) First EPDM resin | (b) EPDM resin blend composition | (a) First EPDM resin | (b) EPDM resin blend composition |
| ML1 + 4 at 125° C. | ASTM D1646 | 114.4 | 117.2 | 116.0 | 119.0 |
| Compound ML |  | 69.5 | 68.0 | 69.1 | 67.6 |
| Min. Vis. (Vm) |  | 54.8 | 52.6 | 53.6 | 51.4 |
| Minimum vulcanization torque ($M_L$) (kgf/cm$^2$) |  | 2.7 | 2.5 | 2.5 | 2.3 |
| Maximum vulcanization torque ($M_H$) (kgf/cm$^2$) | ASTM D5289 | 21.5 | 21.9 | 30.0 | 30.5 |
| Crosslinking density ($M_L$ − $M_H$) |  | 18.9 | 19.3 | 27.5 | 28.2 |
| t'50 (min) |  | 2.2 | 2.1 | 3.4 | 3.2 |
| t'90 (min) |  | 15.7 | 15.3 | 24.5 | 23.9 |
| Hardness (Shore A) | ASTM D2240 | 65.2 | 65.5 | 67.5 | 67.8 |
| Tensile strength (kgf/cm$^2$) | ASTM D412 | 114.7 | 120.0 | 109.9 | 115.0 |
| Elongation (%) |  | 318.1 | 309.9 | 262.3 | 255.5 |

TABLE 2-continued

| Test item | Test method | Example 1 | | Example 2 | |
| --- | --- | --- | --- | --- | --- |
| | | (a) First EPDM resin | (b) EPDM resin blend composition | (a) First EPDM resin | (b) EPDM resin blend composition |
| 100% modulus (kgf/cm2) | | 33.7 | 34.7 | 44.0 | 45.3 |
| 200% modulus (kgf/cm2) | | 71.2 | 75.5 | 91.0 | 96.5 |
| Compression set (%) (70° C., 22 hours) | ASTM D395 | 8.9 | 8.5 | 6.9 | 6.6 |

As shown in Table 2, it could be confirmed that, even though the (a) first EPDM resin matrix and the (b) EPDM resin blend composition according to Example 1 had the same or similar Mooney viscosity (ML (1+4) at 125° C.) and composition, in a vulcanization test using a moving die rheometer (MDR), the (b) EPDM resin blend composition exhibited a 0.6 kgf/cm² increase in difference between the maximum vulcanization torque ($M_H$) and the minimum vulcanization torque ($M_L$), which means a crosslinking density, and a 0.4 minute reduction in t'90, which indicates a crosslinking rate, as compared with the (a) first EPDM resin matrix. In addition, as a result of measuring mechanical properties in accordance with ASTM D412, it could be confirmed that the (b) EPDM resin blend composition exhibited a significant increase in tensile strength as compared with the (a) first EPDM resin matrix. Further, as a result of measuring tensile properties in accordance with ASTM D412, it could be confirmed that, since the (b) EPDM resin blend composition exhibited a 0.4% reduction in tensile properties as compared with (a) first EPDM resin matrix, the (b) EPDM resin blend composition also exhibited improvement in elasticity.

And, it could be confirmed that, even though the (a) first EPDM resin matrix and the (b) EPDM resin blend composition according to Example 2 had the same or similar Mooney viscosity (ML (1+4) at 125° C.) and composition, in a vulcanization test using a moving die rheometer (MDR), the (b) EPDM resin blend composition exhibited a 0.7 kgf/cm² increase in difference between the maximum vulcanization torque ($M_H$) and the minimum vulcanization torque ($M_L$), which means a crosslinking density, and a 0.6 minute reduction in t'90, which indicates a crosslinking rate, as compared with the (a) first EPDM resin matrix. In addition, as a result of measuring mechanical properties in accordance with ASTM D412, it could be confirmed that the (b) EPDM resin blend composition exhibited a significant increase in tensile strength as compared with the (a) first EPDM resin matrix. Further, as a result of measuring tensile properties in accordance with ASTM D412, it could be confirmed that, since the (b) EPDM resin blend composition exhibited a 0.3% reduction in tensile properties as compared with (a) first EPDM resin matrix, the (b) EPDM resin blend composition also exhibited improvement in elasticity.

2. Evaluation of Extrusion Processability

Extrusion processability of each of the (a) first EPDM resin matrix and the (b) EPDM resin blend composition according to Example 1 was evaluated from a degree of shear thinning of a rubber observed in a measurement range using a capillary rheometer for rubbers (ARC 2020, Alpha Technologies Co., Ltd.) capable of simulating a range of 200 sec⁻¹ to 1000 sec⁻¹, which corresponds to a range of a shear rate of an extruder. After preparing 13 g of each of specimens having a width of 5 mm, a length of 5 mm and a thickness of 2.2 mm, shear viscosity was measured on each of the specimens at a temperature of 100° C. at a shear rate of 10 sec⁻¹ to 1000 sec⁻¹ under a piston power of 150 kN. Next, the degree of shear thinning of the specimen was calculated using a trend line.

Degree of shear thinning=|Δ log shear viscosity/Δ log shear rate|

TABLE 3

| | Degree of shear thinning | $R^2$ |
| --- | --- | --- |
| Example 1 (a) First EPDM resin | 0.855 | 0.9996 |
| (b) EPDM resin blend composition | 0.852 | 0.9998 |
| Example 2 (a) First EPDM resin | 0.816 | 0.9997 |
| (b) EPDM resin blend composition | 0.813 | 0.9998 |

Figure 3:
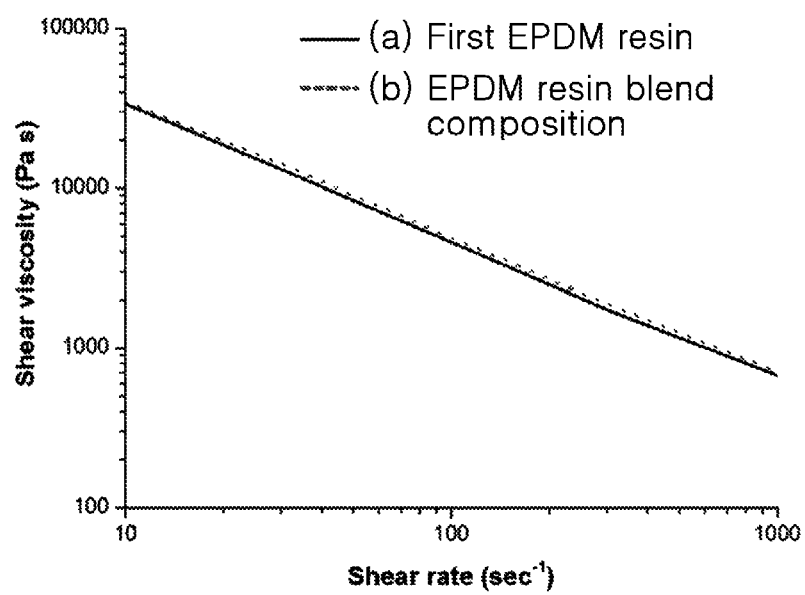
FIG. 3 is a graph depicting degrees of shear thinning of a first EPDM resin matrix and an EPDM resin blend composition according to Example 1.

As shown in Table 3 and FIG. 3, the (a) first EPDM resin matrix and the (b) EPDM resin blend composition according to the Example 1 had the same shear thinning within an experimental error at a shear rate of 10 sec⁻¹ to 1000 sec⁻¹. It could be confirmed that, despite exhibiting a narrower molecular weight distribution than the (a) first EPDM resin matrix, the (b) EPDM resin blend composition did not exhibit deterioration in processability.

Therefore, since the EPDM blend resin composition according to the present invention maintained excellent processability while exhibiting improvement in properties, the EPDM blend resin composition according to the present invention is anticipated to have great commercial value.

Although some embodiments have been disclosed herein, it should be understood by those skilled in the art that these embodiments are provided by way of illustration only, and that various modifications, changes, and alterations can be made without departing from the spirit and scope of the invention. Therefore, it should be understood that the foregoing embodiments are provided for illustrative purposes only and are not to be construed in any way as limiting the present invention.

What is claimed is:

1. An EPDM resin blend composition comprising:
a first EPDM resin matrix; and
a second EPDM resin,
wherein a ratio ($M_{w1}/M_{w2}$) of a weight average molecular weight of the first EPDM resin matrix to a weight average molecular weight of the second EPDM resin ranges from 0.75 to 1.33, and the second EPDM resin has a narrower molecular weight distribution ($M_w/M_n$) than the first EPDM resin matrix, and
wherein a variation rate of Mooney viscosity (ML (1+4) at 125° C.) of the EPDM resin blend composition with respect to a Mooney viscosity (ML (1+4) at 125° C.) of the first EPDM resin matrix is ±10% or less.

2. The EPDM resin blend composition according to claim 1, wherein the ratio of the weight average molecular weight of the first EPDM resin matrix to the weight average molecular weight of the second EPDM resin ranges from 0.95 to 1.05.

3. The EPDM resin blend composition according to claim 1, wherein a log value (log $M_w$) of the weight average molecular weight of the first EPDM resin matrix or the second EPDM resin ranges from 5 to 6.

4. The EPDM resin blend composition according to claim 1, wherein a difference in molecular weight distribution between the first EPDM resin matrix and the second EPDM resin is 0.7 or more.

5. The EPDM resin blend composition according to claim 1, wherein the first EPDM resin matrix comprises 40 wt % to 80 wt % of an ethylene monomer, 20 wt % to 60 wt % of an alpha olefin monomer, and 0.001 wt % to 15 wt % of a diene monomer.

6. The EPDM resin blend composition according to claim 1, wherein the second EPDM resin comprises 40 wt % to 80 wt % of an ethylene monomer, 20 wt % to 60 wt % of an alpha olefin monomer, and 0.001 wt % to 15 wt % of a diene monomer.

7. The EPDM resin blend composition according to claim 6, wherein the alpha olefin monomer is a branched alpha olefin monomer selected from the group consisting of 3-methyl-1-butene, 3-methyl-1-pentene, 4-methyl-1-pentene, 3-methyl-1-hexene, 4-methyl-1-hexene, 5-methyl-1-hexene, 3-ethyl-1-pentene, 3-methyl-1-heptene, 4-methyl-1-heptene, 5-methyl-1-heptene, 6-methyl-1-heptene, 3-ethyl-1-hexene, 4-ethyl-1-hexene, and 3-propyl-1-pentene.

8. The EPDM resin blend composition according to claim 1, wherein the first EPDM resin matrix or the second EPDM resin is prepared using a Ziegler-Natta catalyst or a metallocene catalyst.

9. The EPDM resin blend composition according to claim 1, comprising:
51 wt % to 95 wt % of the first EPDM resin matrix as a main component; and
49 wt % to 5 wt % of the second EPDM resin as an additional component.

10. The EPDM resin blend composition according to claim 1, wherein the EPDM resin blend composition has a narrower molecular weight distribution than the first EPDM resin matrix.

11. The EPDM resin blend composition according to claim 1, wherein the EPDM resin blend composition has a higher uniformity satisfying Equation 1 than the first EPDM resin matrix $$\text{Uniformity} = \frac{1}{\sum_{i=0}^{i=0.5}\sqrt{(a-b)_i^4} + \sum_{i=0.5}^{i=1}\sqrt{(a-b)_i^2}} \quad [\text{Equation 1}]$$

wherein, when an X axis (log values of weight average molecular weights) of a GPC curve is transformed into $X-X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis.

12. The EPDM resin blend composition according to claim 1, wherein the EPDM resin blend composition has a narrower broadness satisfying Equation 2 than the first EPDM resin matrix $$\text{Broadness} = \frac{\sum_{i=0}^{i=1}(a+b)_i}{\sum_i} \quad [\text{Equation 2}]$$

wherein when an X axis (log values of weight average molecular weights) of a GPC curve is transformed into $X-X_{max}$ and a Y axis (concentrations) of the GPC curve is normalized to 0 to 1, a represents the area of a positive region of the GPC curve with respect to the Y axis, and b represents the area of a negative region of the GPC curve with respect to the Y axis.

13. A method for preparing an EPDM resin blend composition, comprising:
(a) preparing a first EPDM resin matrix by polymerizing an ethylene monomer, an alpha olefin monomer and a diene monomer;
(b) preparing a second EPDM resin by polymerizing an ethylene monomer, an alpha olefin monomer and a diene monomer; and
(c) adding the second EPDM resin to the first EPDM resin matrix and mixing the resin components,
wherein a ratio of a weight average molecular weight of the first EPDM resin matrix to a weight average molecular weight of the second EPDM resin ranges from 0.75 to 1.33, and the second EPDM resin has a narrower molecular weight distribution than the first EPDM resin matrix, and
wherein a variation rate of Mooney viscosity (ML (1+4) at 125° C.) of the EPDM resin blend composition with respect to a Mooney viscosity (ML (1+4) at 125° C.) of the first EPDM resin matrix is ±10% or less.

14. The method according to claim 13, wherein step (a) and step (b) are sequentially performed in a single reactor, or simultaneously performed in multiple reactors.

15. The method according to claim 13, wherein mixing in step (c) is performed by a batch mixer or continuous mixer.

* * * * *